United States Patent
Zweig et al.

(10) Patent No.: US 11,021,261 B2
(45) Date of Patent: *Jun. 1, 2021

(54) PROTECTIVE COATINGS FOR TURBINE BLADES AND METHODS

(71) Applicant: The Boeing Company, Chicago, IL (US)

(72) Inventors: Andrew M. Zweig, Ellisville, MO (US); Eric A. Bruton, St. Louis, MO (US); Richard J. Toth, Ballwin, MO (US)

(73) Assignee: THE BOEING COMPANY, Chicago, IL (US)

(*) Notice: Subject to any disclaimer, the term of this patent is extended or adjusted under 35 U.S.C. 154(b) by 183 days.

This patent is subject to a terminal disclaimer.

(21) Appl. No.: 16/245,174

(22) Filed: Jan. 10, 2019

(65) Prior Publication Data

US 2020/0223556 A1    Jul. 16, 2020

(51) Int. Cl.
| | | |
|---|---|---|
| *B64D 41/00* | (2006.01) | |
| *F01D 5/28* | (2006.01) | |
| *C09D 5/20* | (2006.01) | |
| *C09D 7/61* | (2018.01) | |
| *C08L 23/06* | (2006.01) | |
| *C08K 3/34* | (2006.01) | |

(52) U.S. Cl.
CPC ............ *B64D 41/007* (2013.01); *C08K 3/346* (2013.01); *C08L 23/06* (2013.01); *C09D 5/20* (2013.01); *C09D 7/61* (2018.01); *F01D 5/288* (2013.01); *F05D 2220/50* (2013.01); *F05D 2230/90* (2013.01); *F05D 2260/95* (2013.01); *F05D 2300/611* (2013.01); *F05D 2300/615* (2013.01)

(58) Field of Classification Search
CPC ... B64D 41/007; F01D 5/288; F05D 2260/95; C09D 5/20; C09D 7/61; C08L 23/06
See application file for complete search history.

(56) References Cited

U.S. PATENT DOCUMENTS

| | | | |
|---|---|---|---|
| 3,001,973 A | 9/1961 | Piepenbrink et al. | |
| 3,124,605 A | 3/1964 | Wagner | |
| 3,152,162 A | 10/1964 | Fischer et al. | |
| 3,201,372 A | 8/1965 | Wagner | |
| 3,394,164 A | 7/1968 | McClellan et al. | |
| 3,419,414 A | 12/1968 | Marks | |
| 3,948,836 A * | 4/1976 | Narushima | C10M 7/00 524/145 |
| 4,110,317 A | 8/1978 | Moraveck | |
| 4,942,193 A * | 7/1990 | Van Buskirk | C10M 145/16 524/276 |
| 5,126,170 A | 6/1992 | Zwiener et al. | |
| 5,145,324 A * | 9/1992 | Dickes | F04B 49/10 417/222.1 |
| 5,236,741 A | 8/1993 | Zwiener et al. | |
| 5,453,459 A | 9/1995 | Roberts | |
| 7,736,730 B2 | 6/2010 | Jung et al. | |
| 8,091,227 B2 | 1/2012 | Hong | |
| 9,719,367 B2 | 8/2017 | Russ | |
| 9,863,276 B2 | 1/2018 | Prokup et al. | |
| 2010/0255279 A1 | 10/2010 | Hong | |
| 2013/0045105 A1 | 2/2013 | Driver et al. | |
| 2018/0002530 A1 | 1/2018 | Hong | |

FOREIGN PATENT DOCUMENTS

CN  103360931  * 10/2013

OTHER PUBLICATIONS

Machine translation of CN 103350931 (Year: 2013).*

* cited by examiner

*Primary Examiner* — Doris L Lee
(74) *Attorney, Agent, or Firm* — MH2 Technology Law Group LLP

(57) ABSTRACT

A protective coating composition for providing protection to a component of a ram air turbine system in need thereof. The protective coating composition comprises an aqueous-soluble or alkaline-soluble polymer matrix, one or more compressible fillers, and one or more non-compressible fillers. The disclosure also provides a method for providing a protective coating onto components of a ram air turbine system in need thereof for providing indentation and scratch resistance thereto.

20 Claims, 2 Drawing Sheets

PROTECTIVE COATINGS FOR TURBINE BLADES AND METHODS

TECHNICAL FIELD

The present disclosure relates to a protective coating operable to protect turbine blades and other vulnerable surfaces against impact or indentation, scratching, and abrasion.

BACKGROUND

Apart from the operation of engine-driven generators, most present-day aerospace vehicles comprise a ram-air-driven turbine (so called ram air turbine, "RAT") system for providing electrical energy, hydraulic power or, by way of a hydraulic circuit, drive a generator. A ram air turbine is frequently arranged or deployed out from a closable compartment into the airflow in the region of a wing-fuselage fairing as part of the ram air turbine system.

During airworthiness certification flights it is often observed that surfaces of the ram air turbine, including the leading edge of the turbine blades and other components of the ram air turbine may be altered as a result of impact by stones or other particulate matter. Temporary protective tape dispensed from a roll can be painstakingly applied to discrete areas, for example, along the leading edge of the turbine blade, in an effort to attenuate impacts. Indentations, and in particular, scratches or chips either at the leading edge of the turbine blade or elsewhere about the ram air turbine (e.g., housing, etc.) require complex rework. It has been found to be very difficult to attend to the pits, craters, and holes ("sites") scattered throughout the ram air turbine blades or other RAT surfaces, as these sites can be too small for a putty knife with putty-like material.

Likewise, self-adhesive polyurethane tapes, used to protect turbine blades, are moderately soft and typically provide inadequate levels of indentation, scratching and wear protection during takeoff and landing as they are typically employed to "cover up" minor chips and scratches and may experience adhesion loss from the rotor blades during flight as well as altering the edge geometry. As current temporary tapes are not resilient and scratch resistant, aesthetic and possibly more involved replacement of the blade or other components of the RAT is sometimes required.

SUMMARY

In a first example, a protective coating composition operable to protect at least a portion of a ram air turbine system in need thereof from indentation and scratching is provided, the coating composition comprising: an aqueous soluble polymer matrix; one or more compressible fillers; and one or more non-compressible fillers. In one example, the protective coating composition is a temporary protective coating ("TPC"). The composition is operable to adhere to at least a portion of a ram air turbine system. In another example, the composition is operable to adhere temporarily to at least a portion of a ram air turbine. In yet another example, where the composition is operable to adhere to at least a portion of a component of a ram air turbine system.

In another example, the aqueous soluble polymer matrix is soluble in an aqueous alkaline solution and removable from the ram air turbine system. In another example, alone or in combination with any one of the previous examples, the aqueous soluble polymer matrix comprises an acrylic polymer or copolymer. In another example, alone or in combination with any one of the previous examples, the one or more compressible fillers are polymer particles present as an emulsion therein. In another example, alone or in combination with any one of the previous examples, the one or more dispersed or distributed compressible fillers are polymer particles comprising polyolefins, thermoplastic elastomers, thermoset rubbers, polyureas, polyamides, polyfluorocarbons, or combinations thereof.

In another example, alone or in combination with any one of the previous examples, the one or more non-compressible fillers are inorganic. In another example, alone or in combination with any one of the previous examples, the one or more non-compressible fillers are selected from clays, magnesium aluminum silicates and/or calcium silicates. In another example, alone or in combination with any one of the previous examples, the one or more compressible fillers are microcrystalline polyethylene and the one or more non-compressible fillers are calcium silicates.

In another example, alone or in combination with any one of the previous examples, the protective coating is a temporary protective coating. In another example, alone or in combination with any one of the previous examples, the temporary protective coating further comprises one or more of a plasticizer, a leveling agent, an organic solvent, a surfactant, a rheology modifier, a biocide, or a defoamer.

In a second example, a method for protecting surfaces of a ram air turbine system against indentation and scratching is provided, the method comprising: contacting at least a portion of a ram air turbine system component with a protective coating comprising layer being selected independently from an aqueous coating composition comprising: an aqueous soluble polymer matrix; one or more compressible fillers; and one or more non-compressible fillers. The method provides protection of surfaces of the ram air turbine system against indentation and scratching when components of the ram air turbine system are deployed into the airflow of an aerospace vehicle.

In another example, the method further comprises contacting the portion of the ram air turbine system component with a primer coating prior to the contacting with the protective coating.

In another example, alone or in combination with any one of the previous examples, the ram air turbine system component is a turbine blade comprised of one or more of aluminum, painted aluminum, anodized aluminum, aluminum alloys, titanium, titanium alloys, stainless steel, ceramics, organic polymer composites, including reinforced organic polymer composites (thermoplastics and thermosets) reinforced with aramid fibers, glass fibers, carbon fibers or ultrahigh molecular weight polyethylene fibers. In one example, the turbine blade of the ram air turbine system is a fiber reinforced polymer, for example, epoxy-, polyester-, vinyl ester-, nylon- or carbon-fiber thermoplastic composites. In another example, the turbine blade of the ram air turbine system is a fiber reinforced thermoset, for example epoxy-, polyester-, vinyl ester-, nylon-, or carbon-fiber thermoset composites.

In another example, alone or in combination with any one of the previous examples, the aqueous soluble polymer matrix is fully soluble in an aqueous alkaline solution and removable from the portion of the ram air turbine system component. In another example, alone or in combination with any one of the previous examples, the aqueous soluble polymer matrix comprises an acrylic polymer or copolymer.

In another example, alone or in combination with any one of the previous examples, the one or more dispersed or distributed compressible fillers comprise polymer particles present as an emulsion so as to provide for introduction of the compressible fillers with the polymer matrix. In another example, alone or in combination with any one of the previous examples, the polymer particles comprise polyolefins, thermoplastic elastomers, thermoset rubbers, polyureas, polyamides, polyfluorocarbons or combinations thereof.

In another example, alone or in combination with any one of the previous examples, the one or more compressible fillers are selected from clays, magnesium aluminum silicates and/or calcium silicates. In another example, alone or in combination with any one of the previous examples, the one or more compressible fillers are polymer particles of microcrystalline polyethylene and the one or more non-compressible fillers are calcium silicates.

In another example, alone or in combination with any one of the previous examples, the method further comprises, after the contacting step, removing the aqueous coating composition with aqueous alkaline media.

In third example, a ram air turbine of an aerospace vehicle contacted with the temporary protective coating composition, as defined any one of the previous examples, is provided.

DETAILED DESCRIPTION

The term "ram air turbine system" is inclusive of a structural frame and mounts, housing, struts, cables, hydraulics, hydraulic pump, electrical generator, bevel gears, propeller, turbine and turbine blades. A ram air turbine, ram air turbine blades, and ram air turbine housing are non-limiting examples of components of a ram air turbine system. Components of a ram air turbine system are inclusive of metals, metal alloys, ceramics, plastics, composites, and their combinations.

The term "vehicles" as used herein is inclusive of aerospace vehicles, automobiles, locomotives, ships, or the like.

The term "fluid" is used throughout the specification is inclusive of liquids and gases and their combination. Liquids and gases are inclusive of water and air, respectively.

The term "leading edge" as used herein shall be understood to have a broad meaning beyond than shown in FIG. 1 and is inclusive of an elongated narrowed surface designed to encounter the wind or other fluid such as water while traveling at a velocity. An elongated narrowed edge is exemplified by a rotor blade, wing, antenna, windmill blade, or a sharper edge surface as in a propeller blade, ram air turbine blade, or a forward wind encountering point area, for example a radome with a blunt conical form or other generally rounded shape, all of which have the common feature of having fluid passing by their surfaces that may carry particulate matter, ice, and/or debris at a relative velocity capable of altering leading edge surfaces. Of course, the present disclosure is applicable to providing protection for all or part of the components of a ram turbine system whether or not such components comprise leading edges.

The phrase "TPC composition" as used herein is inclusive of a fluid composition that is sprayable, or that can be brushed, onto a component of a ram air turbine system, or into which the component can be dipped. The term "coating" is inclusive of a layer that is derived from the TPC composition and is substantially free from water and/or solvent, e.g., dried and/or cured TPC compositions.

The phrase "modified TPC composition" and its plural are used herein to be inclusive of a TPC composition that comprises an alkaline-soluble polymer matrix and one or more compressible fillers in combination with one or more non-compressible fillers.

A "resultant modified TPC" as used herein is a resultant coating from the modified TPC compositions that is disposed directly or indirectly upon a component of a ram air turbine system and can comprise one or more layers, one of which is derived from the modified TPC composition.

The term "disposed" refers generically to a coating that may or may not be separated from component of a ram air turbine system by other layers. The resultant modified TPC as used herein is a coating that is temporarily disposed upon the component of the ram air turbine system and can comprise one or more layers, one of which is derived from the modified TPC composition, and is at least partially or completely removable.

The phrase "disposed indirectly" refers to a coating that is separated from a component of the ram air turbine system by other layers, while the term "disposed directly" refers to layers that are in intimate physical contact with the component of the ram air turbine system. The term "disposed" refers generically to a coating that may or may not be separated from a component surface by other layers. The resultant modified TPC as used herein is a coating that is disposed upon the component surface and can comprise one or more layers, one of which is derived from the modified TPC composition, and is at least partially or completely removable. In one example, the present disclosure provides a resultant modified TPC that is at least partially or completely removable using aqueous media. An aqueous media can include an alkaline aqueous media, for example, a media having a pH between about 7 and about 14, inclusive of the stated endpoints.

"Compressible fillers" are fillers that possess resiliency to external forces, e.g., possess one or more of measurable compression set resistance, compressive strength yield of thermoplastics, polyamides, and the like which are typically 5 MPa to 350 MPa (1000-50,000 psi), densities (g/m3) of less than 1.5, hardness of less than 90 Shore D, and/or exhibit plastic deformation under stress.

"Non-compressible fillers" are fillers that when used in combination with compressible fillers, possess properties that do not overlap those of the compressible fillers. For example, non-compressible fillers are inclusive of materials with substantially no plastic deformation under stress, greater than 90 Shore D hardness and/or Absolute Hardness of greater than 50 (where quartz has Absolute Hardness of 100, for example), and/or densities greater than 1.5 g/m$^3$. By way of example, non-compressible fillers are inclusive of inorganics. Inorganics as non-compressible fillers are inclusive of silicate, mineral, and clay fillers.

The present disclosure provides for compositions comprising water-/alkaline-soluble polymer compositions comprising a compressible filler in combination with a non-compressible filler. By combining compressible fillers with non-compressible fillers, the temporary protective coating provides improved performance in resisting or eliminating indentations and scratching of one or more surfaces intended for deployment in the airflow of an aerospace vehicle during flight. The present disclosure provides such resistance in a temporary protective coating without requiring separate coatings or multiple layers of different coatings. In one aspect, the present disclosure is directed to improving a temporary protective coating (TPC), e.g., such as a green film that is used to cover the skin of aerospace vehicle during assembly and prior to final painting.

This disclosure also relates to protective coatings and temporary protective coatings that are compression resistant and scratch/abrasion resistant. Such coatings reduce or eliminate indentations to one or more surfaces intended for deployment in the airflow of an aerospace vehicle during flight, for example, components of a ram air turbine system. More specifically, this disclosure relates to coatings that afford protection against compression-related events that can impart surface topographical changes to component surfaces of a ram air turbine system during flight such as high- or low-speed particle impact, abrasion, wear, solid particle erosion and liquid particle erosion.

This disclosure also relates to a temporary, compression/indent resistant protective coating that is removable with organic-based or non-organic-based solvent. In one example, the temporary, compression/indent resistant protective coating is removable without organic solvent. In one specific example, this disclosure relates to temporary, protective coating that is substantially or completely removal by aqueous media or alkaline aqueous media. Media as used herein is inclusive of aqueous solutions, non-aqueous solutions, aqueous and non-aqueous mixtures, dispersions, emulsions, or gels comprising water and organic solvents. In one example, the present disclosure provides a resultant modified TPC that is at least partially or completely removable using an alkaline aqueous media, for example, a media having a pH between about 7 and about 14, inclusive of the stated endpoints.

By way of example throughout this disclosure a leading edge of a ram air turbine blade is used an exemplary "component surface of a ram air turbine system" for demonstrating the applicability of the presently disclosed protective coating or modified TPC. It is understood that other surfaces of the ram air turbine system as well as other leading edges present about the aerospace vehicle that are also subject to such environments would benefit from the presently disclosed compositions and methods.

In one aspect, this disclosure improves conventional temporary coatings by the addition of a non-compressible filler that protects a substrate from scratches. In yet another aspect, this disclosure improves conventional temporary coatings by the addition of compressible filler in combination with a non-compressible filler that provides protection from scratches of the substrate in combination with attenuation of external impact energy to a component surface of a ram air turbine system.

Each additive was added to a commercially available TPC composition separately, each provided an improvement to the characteristics of the resultant TPC when used as a temporary protective coating in protecting the leading edge of a ram air turbine blade, for example. Specifically, the non-compressible filler was observed to attenuate forces that otherwise would scratch through the coating. When the compressible filler and the non-compressible filler are combined together with a commercially available TPC composition in the ranges previously stated both attenuation of scratch events and attenuation of dents/indents of the component surface of a ram air turbine system coated with the TPC were observed compared to a comparative example of the commercially available TPC composition without the compressible filler and the non-compressible filler.

Thus, it was observed that addition of both a compressible filler and a non-compressible filler to an existing TPC composition provided a modified TPC composition with enhancement of the scratch and indent resistance properties when used on test surfaces consistent with surfaces of ram air turbine system components. The resulting resultant modified TPC comprising the compressible filler and non-compressible filler were also observed to be removable from the test surfaces using aqueous media or aqueous alkaline media prior to final painting, for example.

The compositions and methods disclosed herein reduce the number of incurred events to the ram air turbine system components that require action. The present compositions and methods reduce inspection time and labor needed (blending, sanding, re-application of the coating, etc.) with regard to ram air turbine system maintenance and thus, cost is reduced.

Modified TPC Composition

Organic polymer matrixes that can be used in the modified TPC composition as well as in the resultant modified TPC include one or more aqueous media or aqueous alkaline-media soluble polymers that facilitate the dissolution/removal of the polymer matrix from a substrate surface when contacted by aqueous media or alkaline-media. Examples of such aqueous media or alkali-media soluble organic polymer matrixes include thermoplastic polymers with thermosetting polymers. Examples of suitable organic polymers are dendrimers, elastomers, ionic polymers, copolymers such as block copolymers, graft copolymers, random copolymers, star block copolymers, or the like. The organic polymer matrices may comprise elastomers.

The organic polymer matrices can comprise polyacetals, polyureas, polyurethanes, polyolefins, polyacrylics, polycarbonates, polyalkyds, polystyrenes, polyesters, polyamides, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyphosphazenes, polysilazanes, polysiloxanes, polyolefins, fluoropolymers, polybutadienes, polyisoprenes, or a combination comprising at least one of the foregoing organic polymers.

Exemplary alkaline-soluble organic polymer matrices are polyacrylics. The aforementioned organic polymer matrices listed above can be blended and/or copolymerized with the polyacrylic if desired. In one example, the acrylic polymer or copolymer of the presently disclosed modified TPC composition comprises 2-propenoic acid, 2-methyl-, polymer with ethenylbenzene, ethyl 2-propenoate, methyl 2-methyl-2-propenoate and 1,2-propanediol mono (2-methyl-2-propenoate).

In one example, the presently disclosed modified TPC composition comprises an aqueous composition of acrylic polymer or copolymer fully or substantially soluble in and removable from a component of a ram air turbine system using an aqueous solution. In one example, the presently disclosed modified TPC composition comprises an alkaline-soluble resin comprising an acrylic polymer or copolymer fully soluble in and removable from a component of a ram air turbine system using an aqueous alkaline solution. By way of example, TPC compositions that exclude an alkaline-soluble polymer or copolymer are not 100% soluble in aqueous alkaline solutions and become increasingly difficult to remove completely from a component over time and after exposure to the environment. In contrast, the resultant modified TPC of the present disclosure comprising an aqueous media- or aqueous alkaline media-soluble polymer matrix is completely removable from one or more component surfaces of a ram air turbine system due to the modified TPC comprising an aqueous media or alkali-media soluble organic polymer matrix.

In one example, a commercially available aqueous soluble TPC is modified to include the compressible filler and the non-compressible filler material. The modified TPC composition may optionally also include organic solvents, surfactants, other acrylic polymers or copolymers, non-acrylic polymers or copolymers, plasticizers, leveling agents, biocides, rheology modifiers, and defoamers that otherwise do not substantially affect the functionality of the compressible filler and non-compressible filler.

Non-aqueous solvents, if used, for example, to homogenize the modified TPC compositions can include glycol ethers, for example, diethylene glycol monoethylether. Surfactants may be used to assist with emulsifying the aqueous-/alkaline-soluble polymer or copolymer and/or optionally one or more of the added polymer particles and/or compressible filler. Examples of aqueous soluble commercially available TPC's are ZR-6320, ZR-6321, ZR-6322, ZR-6323, Spraylat Temporary Coating (Green), and 63GN011G water-borne, single component Low VOC Alkaline Strippable Coating (PPG Aerospace Industries); Transseal HWAS Green 989-6204; and Aerogarde Green 989-6614 (Groco Specialty Coatings, Dallas, Tex.).

Compressible Fillers

Examples of compressible organic fillers include by way of example, one or more polymer particles. Polymer particles are inclusive of polyolefins, fluoropolymers, polyurethanes, polyureas, polyamides, thermoplastic elastomers and thermoset rubbers. In one example polyethylene, polypropylene, polyethylene-polypropylene copolymers and the like can be used as compressible organic materials in the presently disclosed TPC. In one example, crystalline polyethylene, microcrystalline polyethylene, or partially crystalline polyethylene, is used. Examples of fluoropolymer include, but are not limited to, PVF (polyvinylfluoride), PVDF (polyvinylidene fluoride), PCTFE (polychlorotrifluoroethylene), PFA (perfluoroalkoxy polymer), FEP (fluorinated ethylene-propylene), ETFE (polyethylenetetrafluoroethylene), ECTFE (polyethylenechlorotrifluoroethylene), perfluoropolyoxetanes, and polytetrafluoroethylene (TEFLON™). Non-limiting examples of compressible fillers that are polymer particles include TEXTURE ULTRA FINE® microcrystalline polyethylene emulsion (Shamrock Industries), and ORGASOL® ultrafine polyamide powders (Arkema; King of Prussia, Pa.).

In one example, the modified TPC composition comprises suspended and/or dispersed polymeric beads and/or polymeric flakes as the compressible filler. In another example, the polymeric beads comprise one or more polyolefin polymers. The polyolefin polymers of the polymer particles include, for example, polyethylene, and copolymers thereof. The polyolefin polymers of the polymer particles may be crystalline, semi-crystalline, amorphous, or blends thereof. Non-acrylic polymer or copolymer aqueous dispersions for use in the disclosed modified TPC compositions may include beads of thermoplastic elastomers, such as ethylene copolymers, urea polymer, thermoset rubber, styrene-butadiene-rubber, butadiene-rubber, polyurethane elastomer, silicone elastomer, and the like. Suitable polymer particles include TEXTURE ULTRA FINE product (microcrystalline polyethylene) available from Shamrock Technologies (Newark, N.J.); PERGOPAK M3 and PERGOPAK M5, polymethyl urea resin with reactive methylol groups (Huber Engineered Materials, Atlanta, Ga.).

The polymer particles can be beads, flakes, or rods or be of other shapes or combinations of shapes. The polymer particles can have average particle sizes of about 1 to about less than or equal to 100 micrometers. In one example, the polymer particles have an average particle size of 2 to about 75 micrometers. In another example, the polymer particles have an average particle size of 10 to about 50 micrometers.

The volume of the compressible filler added to the modified TPC composition in an amount of up to about 13 percent pigment volume concentration (PVC), so as to attenuate scratching and indentation of the substrate and is based on the total volume of the modified TPC composition. In one example, the volume of the polymer particles added to the modified TPC composition in an amount of about 1 percent PVC to about 5 percent PVC, based on the total volume of the modified TPC composition. In one example, the amount of polymer particles was about 1.4 percent PVC to about 4 percent PVC of the modified TPC composition. In another example, the volume of the polymer particles added to the modified TPC composition in an amount of about 2 percent PVC to about 4 pigment percent PVC, based on the total volume of the modified TPC composition. In another example, the volume of the polymer particles added to the modified TPC composition in an amount of about 3 percent PVC to about 4 pigment percent PVC, based on the total volume of the modified TPC composition. The percent volume of the polymer particles can be varied in accordance with the properties of the polymeric particles used in the polymer particles so as to achieve desired protective coating properties in the resultant modified TPC.

In one example, the compressible filler when used in an amount of about 0.05 percent PVC to about 2 percent PVC to the modified TPC composition the required force to indent an aluminum surface test sample through the presently disclosed coating was increased relative to a TPC composition without the compressible filler. The percent volume of the compressible filler can be varied in accordance with the properties of the compressible filler so as to achieve desired protective coating properties in the resultant modified TPC.
Non-Compressible Fillers Non-compressible fillers are chosen from inorganic materials. In one example, the non-compressible fillers are chosen from inorganic minerals. Examples of inorganic mineral non-compressible fillers include clays, for example, kaolinite clay or montmorillonite-smectite clay, magnesium aluminum silicates, and/or calcium silicates, e.g., wollastonite ($CaSiO_3$) and combinations thereof.

In one example, the volume of the non-compressible filler is added to the modified TPC composition in an amount of up to about 5 percent PVC, based on the total volume of the modified TPC composition. In one example, the volume of the compressible filler is added to the modified TPC composition in an amount of about 0.1 percent PVC to about 5 percent PVC, based on the total volume of the modified TPC composition. In another example, the volume of the compressible filler is added to the modified TPC composition in an amount of about 0.5 percent PVC to about 4 percent PVC, based on the total volume of the modified TPC composition. In another example, the volume of the compressible filler is added to the modified TPC composition in an amount of about 1 percent PVC to about 3 percent PVC, based on the total volume of the modified TPC composition. The amounts or volume of non-compressible filler and compressible filler may be modified to protect different ram air system component material surfaces coated with the modified TPC composition against scratches and indents.

The components of a RAM air turbine system can be coated with the modified TPC composition by spray coating, dip coating, brush coating, electrostatic painting, or the like to a desired thickness so as to provide resistance against or attenuation of dents/indents, abrasion, wear and erosion. Other coating techniques may be used. While the attenuation of dents and abrasion can be correlated with the thickness of the modified TPC composition, a thin coating, for example, 0.5 to 4 mils (0.013-0.102 mm) provides for reduced material costs and/or environmental impact when the coating is removed.

The presently disclosed resultant modified TPC is easily solubilized or emulsified and removable by a stream of water or aqueous alkaline solutions, collectively "strippers." In one example, strippers are aqueous alkaline solutions having a pH >7 to ≤14. Non-limiting examples of strippers include solutions containing 5-10 wt. % monoethanolamine, 1-5 wt. % caprylic acid, 5-13 wt. % ethylene glycol monophenyl ether having a pH of about 10.5±0.5; 0.5-1.5 wt. % sodium alkylbenzene sulphonate, 7-13 wt. % butyl carbitol having a pH of about 10.4. Other commercially available strippers may be used.

In one example, the resultant TPC is a peelable-like TPC or film, e.g., one that is removed manually in sheet or film form from the surface of the substrate. In one example, the resultant TPC excludes a peelable-like TPC or film, e.g., one that is removed manually in sheet or film form from the surface of the substrate.

In one exemplary example, the resultant TPC can comprise a layer of primer, a base coat layer, an optional tie layer and a top coat layer, wherein one of these layers is derived from the modified TPC composition and the resultant TPC generally has a tensile strength of greater than or equal to about 1000 psi (70 kg/cm2), a tensile elongation at break of greater than or equal to about 350% for sprayable coatings, a tensile set at break of less than or equal to about 60%. In the exemplary example, the base coat layer may be optional, or the top coat layer may be optional.

The modified TPC composition can also comprise an optional organic solvent. Organic solvents may be protic solvents, aprotic solvents, or mixtures comprising at least one of the foregoing solvents. Examples of suitable organic solvents are methanol, ethanol, propanol (1-propanol, 2-propanol, isopropanol), toluene, xylene, butyl acetate, propyl acetate, methyl isobutyl ketone, methyl n-amyl ketone (MAK), methoxypropyl acetate, N-methylpyrrolidone, mono-and di-glycol ethers or a combination comprising at least one of the foregoing solvents.

Modified TPC compositions can also be substantially solvent-free. In those situations where the modified TPC composition has a low enough viscosity (without the use of solvent or water), solvents may be excluded from the modified TPC composition and the modified TPC composition would then be referred to as being 100% solids.

When solvent is added to the modified TPC composition, it is generally added in an amount of about 2 to about 60 volume %, based on the total weight of the modified TPC composition, for example, to facilitate mixing and/or dispersion of the components of the modified TPC composition. In one example, the solvent is added to the modified TPC composition in an amount of about 5 to about 55 volume %, based on the total weight of the modified TPC composition. In another example, the solvent is added to the modified TPC composition in an amount of about 10 to about 50 volume %, based on the total weight of the modified TPC composition. In yet another example, the solvent is added to the modified TPC composition in an amount of about 40 to about 45 volume %, based on the total weight of the modified TPC composition.

Other optional additives useful in the modified TPC compositions include leveling agents, defoamers, hydrolysis stabilizers, UV stabilizers, pigments, dispersants, curing accelerators, diluents, or combinations thereof. In one example, optional additives described above are included in the present composition. In another example, optional additives described above are excluded from the present composition.

These fillers can be added to the modified TPC composition at concentrations effective to obtain desired properties. Other fillers that can be used to control dielectric constants or electrochemistry, for example, are well known. Examples include various metal oxides, metal powders, metal fibers, or the like, or a combination comprising at least one of the foregoing fillers.

The modified TPC composition can be applied in one or more layers to the substrate surface in order to create a protective coating. These layers can have the same or different compositions. The modified TPC composition can be applied in one or more layers to the substrate surface in order to create a temporary protective coating. The modified TPC composition can be applied in a single step or in multiple steps and can exist in the form of a single layer or multiple layers. The resultant modified TPC can therefore consist of a single layer applied to components of the RAM air turbine system. Alternatively, the resultant modified TPC can comprise multiple layers, wherein one of the layers comprises a coating that is derived from the modified TPC composition. One or more applications of the modified TPC composition may be applied to the component of the RAM air turbine system so as to provide a resultant modified TPC having a targeted thickness and/or targeted tensile strength. These methods of application of the modified TPC composition are suitable for the formation of a resultant modified TPC on various RAM air turbine components. In one example, the modified TPC compositions are suitable for the formation of a resultant modified TPC on all or part of the components of a ram air turbine system, including, without limitation, some or all portions of the turbine blades. These methods of application of the modified TPC composition are suitable for the formation of a resultant modified TPC on various surfaces, e.g., metals, plastics, wood, composites, cement, concrete or glass.

The surface of the portion of the component of the ram air turbine system to be coated with the modified TPC composition may optionally be treated (i.e., cleaned or modified) to improve adhesion to the component. A primer can be applied to the turbine blade to be coated with the modified TPC composition for corrosion protection, or to enhance the removal of the resultant modified TPC. Examples of suitable corrosion resistant primers are epoxy and polyurethane coatings containing corrosion inhibitors. "Wash primers" comprising polyvinyl butyral chemistry and the like can also be used, because of their solubility in aqueous media, to assist the removal of the resultant modified TPC. An exemplary primer is a water borne epoxy primer. The modified TPC composition can then be coated onto a primer layer (or base coat layer) to form a top coat layer.

In one example, the portion of the component of the ram air turbine system may also optionally be treated by coating it with a layer of primer, a base coat layer, a tie layer and a top coat layer if desired. The optional surface treatment is conducted for purposes of cleaning the surface of the component of the ram air turbine system and for purposes of improving adhesion between the modified TPC composition and the component of the ram air turbine system. Treating the surface of the component of the ram air turbine system may involve mechanical roughening, grit blasting, sanding, cleaning, chemical etching, plasma treatment, chemical conversion coating, or other processes known to improve adhesion of primers or other coatings applied later in the process.

In one example, the primer, the base coat layer as well as the top coat layer can all be derived from the modified TPC composition. In another example, only the top coat layer can be derived from the modified TPC composition. After the application of an optional primer and a base coat, the modified TPC composition may be applied to the component of the ram air turbine system to form a resultant modified TPC that provides a high resistance to indentation via impact, wear, abrasion and/or vibration.

In the spraying process, modified TPC compositions having different amounts and/or types of solvent can be used to form the coating layers on the component of the ram air turbine system. For example, when the non-aqueous, coatings use moisture curing mechanisms, aqueous coatings can be used sequentially with non-aqueous coatings. In another example, the aqueous modified TPC compositions can be used to form all of the protective coating layers (e.g., the layer of primer, base coat layer, tie layer, or the like) other than the top coat layer, while a non-aqueous modified TPC composition is used as the final top coat.

In another method of using the modified TPC composition, alternating layers or any random combination of the aqueous and non-aqueous modified TPC compositions may be sprayed in any sequence to form the protective coating. The combined use of aqueous and non-aqueous sprayable modified TPC compositions provides a method of reducing the overall water sensitivity of aqueous coatings, while reducing the amount of organic solvents used to form the resultant modified TPC.

In one example, after the application of the modified TPC composition to the component of the ram air turbine system, the resultant modified TPC can be at least partially or fully cured by moisture curing and/or heat curing. If solvent is present in the modified TPC composition, it is desirable to drive off substantially all of the moisture during the curing process. The coatings may be cured at either ambient temperature (e.g., by air drying or so-called forced drying), or at an elevated temperature (heat curing). A heat curing process to effect curing and to drive off the solvent can utilize heat from convection, conduction and/or radiation. Electromagnetic radiation in the form of microwave radiation, infrared radiation, ultraviolet radiation, or visible light radiation and combinations thereof can be used to facilitate curing, set up, or drying.

The resultant modified TPC provides protection to surfaces of components of the ram air turbine system during flight, such as leading-edge surfaces of ram air turbine blades. The resultant modified TPC can be used to protect other surfaces and/or leading edges of the aerospace vehicle, such as wings, fuselage, nose cones, radomes, or the like, to protect such surfaces and/or leading edges during flight t. Other applications may include coatings for motor or marine vehicles, in which the substrate surfaces are subjected to damage caused by assembly-line impact and vibration, or the like.

Figure 1A:
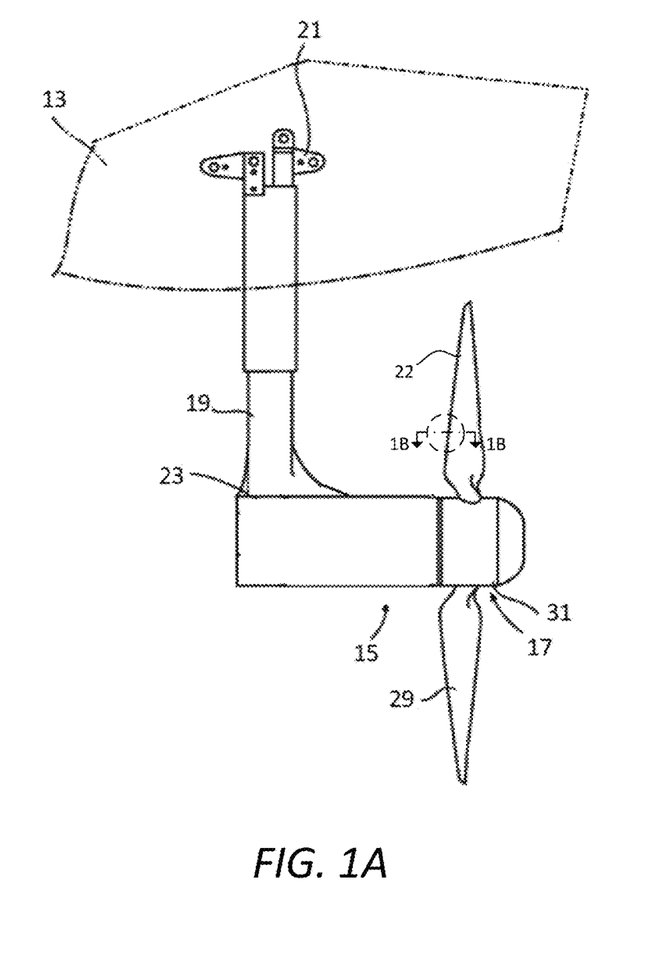
FIG. 1A depicts a ram air turbine (RAT) in a deployed state.

It is illustrated in FIG. 1A, an aerospace vehicle 13 can include a RAT system 15 for generating electrical power for the aerospace vehicle 13, typically when the RAT system 15 is presented to an airstream exterior of the aerospace vehicle 13. The RAT system 15 can include a RAT 17 that can be suspended from the aerospace vehicle 13 by, for example, a pylon 19 and mounting assembly 21. The RAT system 15 can further include a housing 23 attached to the pylon 19.

The RAT system 15 additionally includes a turbine comprising a first set of multiple blades 29 projecting from a propeller 31, external to the housing 23, and configured such that when the blades 29 are exposed to airstream flowing past or through the blades 29, propeller 31, or RAT system 15, the airstream flow generates rotational movement of the propeller 31.

The RAT 17 can be stored within a suitable compartment in the fuselage or wing of the aerospace vehicle 13 and can be deployed quickly and easily, for example, by moving the pylon 19 relative to the mounting assembly 21, thereby presenting the RAT system 15 to an exposed position within the airstream flowing past the aerospace vehicle 13. Of course, aerospace vehicle 13 or RAT systems 15 are envisioned where the RAT system 15 is configured for permanent exposure to the airstream. Although only two blades 29 have been shown in FIG. 1A, any number of blades 29 can be used and one or more, or all of the blades can be coated with the presently disclosed protective coating. Additionally, the blades 29 are non-limiting examples of a blade 29, propeller 31, or RAT system 15 configurations, and alternative configurations can be employed. In another example, the blades 29 and/or leading edges can be configured with an alternative shape, design, or skew, for instance, to provide the above-described interaction when exposed to a predetermined airstream, defined by the operating environment of a flying aerospace vehicle 13.

Figure 1B:
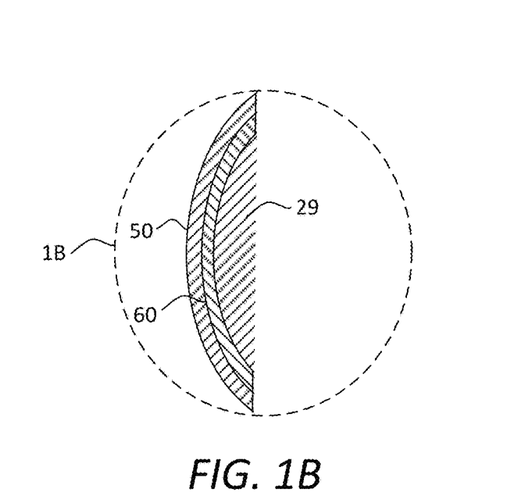
FIG. 1B depicts a protective coating on a surface in accordance with the present disclosure.

FIG. 1B is a partial sectional view of protective layer 50 shown, for example, on the ram air turbine blade. In the exemplary embodiment, protective layer 50 includes an optional primer layer 60. Alternatively, protective layer 50 may have any number of protective layers that enable absorption and deflection of objects as described herein. As shown in FIG. 1B, primer layer 60 is in contact with blade 29.

In the exemplary embodiment, protective layer 50 includes compressive filler that facilitates absorbing forces when contacted by an object at leading edge 22. Upon receiving impact forces, compressive filler of protective layer 50 absorbs the kinetic energy of object while non-compressive filler prevents or eliminates indentation, scratching, or wear while substantially maintaining airfoil geometry of blade 29 and ram air turbine operation.

EXAMPLES

The following examples, which are meant to be exemplary, not limiting, illustrate compositions and methods for manufacturing and using the protective coatings described herein. Examples 1 to 5, comprising an alkaline-soluble resin comprising an acrylic polymer or copolymer, were uniformly applied to a test turbine blade using an airless spray system or a flow applicator. Approximately 4 to 6 mL of the modified TPC composition is used for each square foot of surface to be protected, yielding a uniform dried thickness of 0.5 to 4 mils (0.013-0.102 mm). Alternatively, the modified TPC composition is applied to the surface and uniformly spread across the surface using a painting brush or pad. The modified TPC composition may also be applied by dipping an applicator into the modified TPC composition and uniformly applying the applicator and modified TPC composition across the surface of the component of the ram air turbine system.

The coated component of the ram air turbine system is then allowed to dry depending on environmental conditions and the thickness of the coating composition applied to the surface. The modified TPC composition acquires stable mechanical properties as the resultant modified TPC within approximately 24 hours.

To substantially or completely remove the resultant modified TPC from the surface, an aqueous alkaline solution is applied to the coated surface using a spray system or a non-abrasive cleaning pad to convert the alkaline-soluble temporary protecting coating into a water-soluble material. Water rinsing is used to remove the water-soluble material.

Exemplary TPC compositions were used as comparative examples and provide an abrasion-resistant, colored transparent film. Exemplary TPC compositions used as comparative examples included ZR-6320, ZR-6321, ZR-6322, and ZR-6323 (PPG Aerospace, Sylmar, Calif.); Spraylat Temporary Coating (Green); and 63GN011G water-borne, single component Low VOC Alkaline Strippable Coating (PPG Aerospace, Sylmar, Calif.); Transseal HWAS Green 989-6204; Aerogarde Green 989-6614 (Groco Specialty Coatings, Dallas, Tex.). Typically, the TPC compositions comprise approximately 33 wt % solids of polymer matrix.

Experimental examples were prepared as disclosed in Table 1. Primers used included 13P20-44MNF and 10P20-44, both high solids epoxy primers (Azko Nobel) or CA 7502 chrome free epoxy primer (PPG Aerospace, Sylmar, Calif.). Primers were applied at a 0.5 mil (0.013 mm) or 0.95 mil (0.024 mm) targeted thickness. Exemplary polymer particles tested included TEXTURE ULTRA FINE microcrystalline polyethylene emulsion (Shamrock Industries) and an exemplary compressible inorganic filler of Vansil W50 (wollastonite, Vanderbuilt Minerals LLC).

The total weight percent of combination of polymer particles and non-compressible filler was approximately 8-15 weight percent solids in the resultant modified TPC at an average thickness of 2 mils (0.05 mm) or less. The commercially available TPC was added to a mixing container together with the polymer particles and non-compressible filler and mixed at 500 RPM for 2 minutes without vacuum, then 2000 RPM for 15 minutes without vacuum, and finally at 2000 RPM for one minute without vacuum. The TPC formulations were spray coated on the samples using a spray gun and a temperature and humidity controlled painting booth and forced air convection oven for drying. Coatings are typically dried in air at ambient temperature. For larger RAT devices, aerospace vehicle paint hangars can be used and may be temperature controlled to about 49° C. (120° F.) for several hours to accelerate the drying process. Removal of the TPC can be performed by spraying the entire RAT with the desired cleaning agent with a pressure hose system. As the TPC is green in color, the removal process is visually apparent. The RAT and/or the aerospace vehicle the RAT is attached thereto is then rinsed with clean water.

TPC compositions, without the combination of polymer particles and compressible fillers, were used as Comparative Examples and subjected to testing concurrently with the presently disclosed compositions.

Scratch Test—Scratch and Indent results were evaluated in a method similar to ASTM D7027-13, in three ways using a stylus as follows:

Scratch and Indent results were evaluated in three ways using a stylus as follows:

First Scratch Through (Point at which metal is first observed in the scratch)

Total Scratch Through (Represents the point at which there is no coating under the stylus).

Indent threshold (Coating removed for this test and a point where a finger nail catches on the scratch is found and related back to the force that was applied at that point. (Indent is usually occurring in the clad before the stylus breaks through the TPC.)

Figure 2:
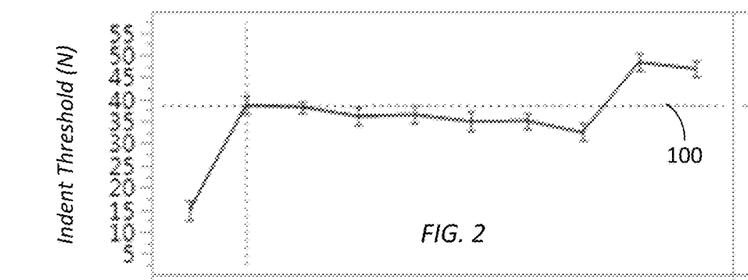
FIG. 2 depicts Indent Threshold experimental data of controls and samples prepared in accordance with the present disclosure.
Figure 3:
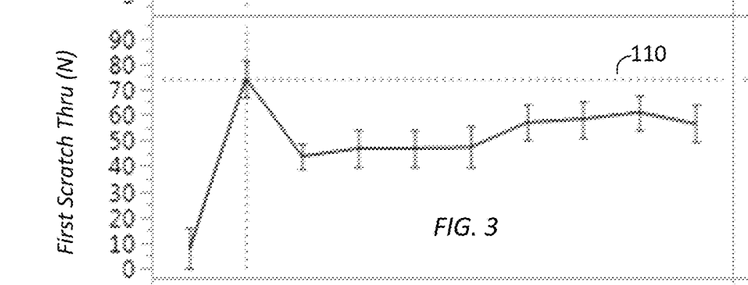
FIG. 3 depicts First Scratch Through experimental data of controls and samples prepared in accordance with the present disclosure.
Figure 4:
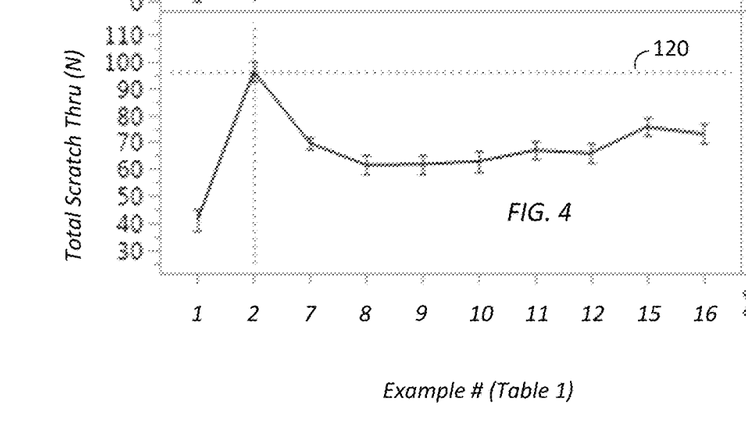
FIG. 4 depicts Total Scratch Through experimental data of controls and samples prepared in accordance with the present disclosure.
Figure 5:
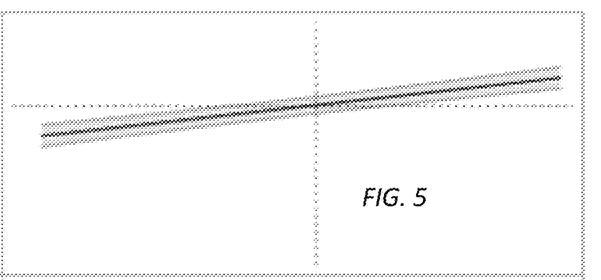
FIG. 5 depicts coating thickness variation for Indent Threshold experimental data of controls and samples prepared in accordance with the present disclosure.
Figure 6:
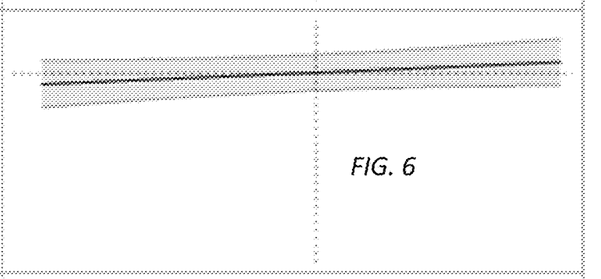
FIG. 6 depicts coating thickness variation for First Scratch Through experimental data of controls and samples prepared in accordance with the present disclosure.
Figure 7:
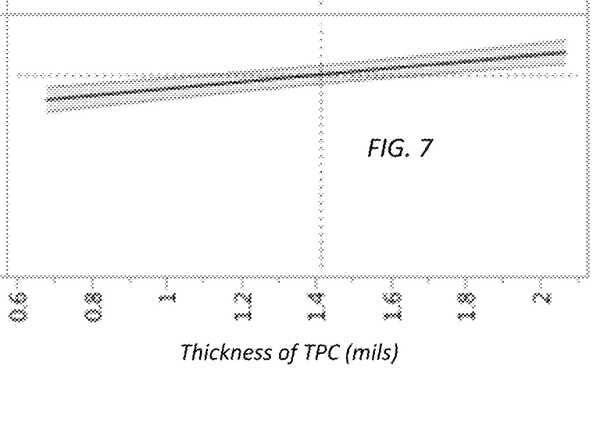
FIG. 7 depicts coating thickness variation for Total Scratch Through experimental data of controls and samples prepared in accordance with the present disclosure.

The position on the scratch is related back to the amount of force (N) that was applied in the Z Load for Indent Threshold, Total Scratch Through, and First Scratch Through (lines 100, 110, and 120 on the graphs of FIG. 2, FIG. 3, and FIG. 4, respectively, being 39 N, 74 N, and 96 N, respectively) for a representative sampling from Table 1. Indent is usually occurring in the clad before the stylus breaks through the coating. FIGS. 5, 6, and 7 depict the thickness variation effects of the Indent Threshold, Total Scratch Through, and First Scratch Through for this data set.

The data of Table 2 shows presently disclosed resultant modified TPC's providing improved resistance to indentation and scratch as demonstrated by comparable or better Scratch Through performance values and superior Indent Pressure thresholds than control TPC's without the combination of compressible fillers and non-compressible fillers.

While the disclosure has been described with reference to exemplary examples, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular example disclosed as the best mode contemplated for carrying out this disclosure, but that the disclosure will include all examples falling within the scope of the appended claims.

TABLE 1

Presently disclosed modified TPC compositions.

| Sample # | Base TPC | Non-compressible Filler | Polymer Particles % PVC | Compressive Filler | Compressive Filler % PVC |
|---|---|---|---|---|---|
| 1 | 63GN011G | None | | None | |
| 2 | ZR6320 | None | | none | |
| 3 | ZR6320 | Vansil W50 | 10 | Texture Ultra Fine | 5 |
| 4 | ZR6321 | Vansil W50 | 10 | Texture Ultra Fine | 5 |
| 5 | ZR6322 | Vansil W50 | 10 | Texture Ultra Fine | 5 |
| 6 | ZR6323 | Vansil W50 | 10 | Texture Ultra Fine | 5 |
| 7 | ZR6320 | Vansl W50 | 2.5 | Texture Ultra Fine | 5 |
| 8 | ZR6320 | MP1538 | 5 | None | |
| 9 | ZR6320 | MP4526 | 5 | None | |
| 10 | ZR6320 | MP1538 | 5 | Texture Ultra Fine | 5 |
| 11 | ZR6320 | MP4526 | 5 | Texture Ultra Fine | 5 |
| 12 | ZR6320 | Vansil W50 | 5 | Texture Ultra Fine | 5 |
| 13 | ZR6320 | Vansil W50 | 5 | Texture Ultra Fine | 5 |
| 14 | ZR6320 | Vansil W50 | 5 | Texture Ultra Fine | 5 |
| 15 | ZR6320 | Vansil W50 | 5 | PergoPak M3 | 5 |
| 16 | ZR6320 | Vansil W50 | 5 | PergoPak M5 | 5 |

TABLE 2

Resultant Modified TPC properties. All TPC were approximately 0.8-1.5 mils. 13P20-44MNF primers was 0.5 mils and 10P20-44 primer was 0.95 mils. Damage resistance was dependent on applied primer thickness. Areas where primer has been scratched through would require rework.

| | Specific Mtl | Scratch Through (N) | Indent Pressure (N) | Removability | VOC (g/l) |
|---|---|---|---|---|---|
| Comparative TPC's | ZR6320 (QPL) | 84 | 31 | Good | 85 |
| | 63GN011G (QPL) | 38 | 10 | Okay | 1 |
| Primers | 10P20-44MNF | 43 | ≤5 | N/A | 350 |
| | 10P20-44 | 31 | ≤5 | N/A | 350 |
| Resultant modified TPC | ZR6320 + polymer particles and compressive fillers | 74 | 45 | Good | 85 |

We claim:

1. A protective coating composition operable to protect at least a portion of a component of a ram air turbine system from indentation and scratching, the protective coating composition comprising:
   an aqueous soluble polymer matrix;
   one or more compressible fillers; and
   one or more non-compressible fillers;
   wherein the protective coating composition is operable to adhere to at least a portion of a component of a ram air turbine system;
   wherein the total amount of compressible fillers and non-compressible fillers is from about 8 percent to about 15 percent by weight of the protective coating composition; and
   wherein the protective coating composition has a total scratch through force of from about 50 N to about 85N.

2. The protective coating composition of claim 1, wherein the aqueous soluble polymer matrix comprises an acrylic polymer or copolymer.

3. The protective coating composition of claim 1, wherein the one or more non-compressible fillers are selected from clays, and/or magnesium aluminum silicates and/or calcium silicates.

4. The protective coating composition of claim 1, wherein the one or more compressible fillers are polymer particles and the one or more non-compressible fillers are inorganic minerals.

5. The protective coating composition of claim 1, wherein the aqueous soluble polymer matrix is fully soluble in an aqueous alkaline solution and removable from the portion of the component of the ram air turbine system.

6. The protective coating composition of claim 5, wherein the protective coating composition is a temporary protective coating composition.

7. The protective coating composition of claim 1, wherein the one or more compressible fillers are polymer particles present as an emulsion therein.

8. The protective coating composition of claim 7, wherein the polymer particles comprise polyolefins, thermoplastic elastomers, thermoset rubbers, polyureas, polyamides, fluoropolymers, or combinations thereof.

9. The protective coating composition of claim 7, wherein the polymer particles are microcrystalline polyethylene and the one or more non-compressible fillers are calcium silicates.

10. A method of protecting ram air turbine system components against indentation and scratching, the method comprising:
    contacting at least a portion of a surface of a component of a ram air turbine system with a coating composition, the coating composition comprising:
    an aqueous soluble polymer matrix;
    one or more compressible fillers; and
    one or more non-compressible fillers;
    wherein the total amount of compressible fillers and non-compressible fillers is from about 8 percent to about 15 percent by weight of the protective coating composition; and
    wherein the protective coating composition has a total scratch through force of from about 50 N to about 85N; and
    providing protection of the portion of the component of the ram air turbine system against indentation and scratching.

11. The method of claim 10, further comprises contacting the portion of the surface of the component of the ram air turbine system with a primer coating prior to the contacting with the coating composition.

12. The method of claim 10, wherein the component of the ram air turbine system is a turbine blade comprised of one or more of aluminum, painted aluminum, aluminum alloy, anodized aluminum, titanium, titanium alloys, stainless steel, ceramic, fiber reinforced thermoplastic, or fiber reinforced thermoset, wherein the fiber is selected from aramid fibers, glass fibers, carbon fibers or ultrahigh molecular weight polyethylene fibers.

13. The method of claim 10, wherein the aqueous soluble polymer matrix is soluble in an aqueous alkaline solution and removable from the component of the ram air turbine system.

14. The method of claim 10, wherein the aqueous soluble polymer matrix comprises an acrylic polymer or copolymer.

15. The method of claim 10, wherein the one or more non-compressible fillers are selected from clays, magnesium aluminum silicates and/or calcium silicates.

16. The method of claim 10, wherein the one or more compressible fillers are polymer particles of microcrystalline polyethylene and the one or more non-compressible fillers are calcium silicates.

17. The method of claim 10, further comprising, after the contacting step, removing the coating composition with aqueous alkaline media.

18. The method of claim 10, wherein the one or more dispersed or distributed compressible filler is polymer particles present as an emulsion.

19. The method of claim 18, wherein the polymer particles comprise polyolefins, thermoplastic elastomers, thermoset rubbers, polyureas, polyamides, fluoropolymers, or combinations thereof.

20. A ram air turbine of an aerospace vehicle contacted at least at a portion thereof with the protective coating composition, as defined in claim 1.

\* \* \* \* \*